Patented Aug. 21, 1923.

1,465,317

UNITED STATES PATENT OFFICE.

DOMINGO SANGUINETTI, OF BUENOS AIRES, ARGENTINA.

COLORED ARTIFICIAL ASPHALTUM.

No Drawing. Application filed February 16, 1921. Serial No. 445,375.

*To all whom it may concern:*

Be it known that I, DOMINGO SANGUINETTI, a citizen of the Argentine Republic, residing at Calle Maipú 671, Buenos Aires, Argentine Republic, have invented new and useful Improvements in Colored Artificial Asphaltum, of which the following is a specification.

This invention relates to the manufacture of a novel composition having the same properties of impermeability, consistency and plasticity and being as adhesive and resilient as natural asphaltum, and partaking the same as this latter material, of the condition that it will harden with low temperatures and will become plastic and malleable when being submitted to heat, with the advantage that this new compound may be manufactured of any desired color and its degree of hardness, resiliency and adhesiveness may conveniently be varied.

A material of the above description may practically be used for many purposes, such as the construction of floors and roofings, for waterproofing walls, floors, timber, paper, fabrics and the like; it may further be used for setting tiles, mosaics and the like; for fixing window panes or other glasses, for joining and waterproofing joints of similar or different kinds, as well as in connection with any other purpose wherein an adhesive, waterproof and resilient material, of the consistence of natural asphaltum is required, but without the drawback of the black color which absorbs and alters any colouring material which may be applied thereto.

The compound is used in the same way as natural asphaltum; it is dissolved and molded or applied while hot. It may also conveniently be prepared and applied as paste or liquid when cold, for which purpose to each kilogramme of artificial asphaltum from 40 to 100 grammes of naphtha, oil of turpentine, linseed oil, or the like is added, according to the condition of fluidity or consistence to be given to the paste or liquid.

The ingredients used for manufacturing this novel industrial product, are india rubber in solution, resin and a solvent of both; to these materials, a suitable colouring stuff, reduced to impalpable powder, is added.

By way of example, I shall indicate one of the formulæ which in practice have proven most satisfactory; however, I desire it to be understood that the proportions of the ingredients may be varied without departing from the scope of the invention.

According to this formula just referred to, the compound is made up as follows:

18 kg. of india rubber in liquid form, liquefied by heating.

12 kg. of resin;

6 kg. of naphtha, benzene, oil of turpentine, linseed oil or other suitable organic solvent which dissolves rubber.

100 kg. of colouring material, such as powdered oxide of iron or powdered marble or stone, powdered brick and ochre, or any other suitable material, finely powdered and which will not alter the properties of the foregoing ingredients.

The shade of the resulting product will of course be in accordance with the nature and amount of the colouring material used in the composition; thus for instance, with iron oxide a red colored product will be obtained; the use of powdered brick or stone will give a dark color, and so on.

The composition is prepared by liquefying by heat the india rubber and the rosin, whereupon the solvent is added and finally the colouring material in finely powdered condition is thoroughly incorporated with the mass.

The larger the proportion of rubber contained in the composition, the better will be its conditions of malleability and adhesiveness, while an increase in the proportion of resin will render the composition harder and more rigid. The amount of solvent used controls the consistency of the product, which is softer or harder during handling according as the amount of solvent is increased or decreased; for the mixture of india rubber, resin, and colouring matter without the solvent produces an exceedingly hard product, and the addition of the naphtha or other solvent makes the product softer to facilitate its handling. The amount of softening obtained increases with the amount of solvent used, to make a product which varies from a condition of relative hardness to a condition of pastiness; but this softer condition is only temporary, especially when naphtha is the solvent used, as the naphtha evaporates, and the product remains in the pasty condition only during the time required for such evaporation.

Having now described my said invention, I declare that what I claim as new and desire to secure by Letters Patent, is;

1. A new industrial product, essentially made up of varying proportions of: 18 kgs. of india rubber, 12 kgs. of resin, a sufficient quantity of a rubber-dissolving organic solvent to dissolve the resin and india rubber, 100 kgs. of colouring material, reduced to impalpable powder, substantially as above described and for the purpose set forth.

2. A new industrial product, essentially made up of the following ingredients in substantially the proportions named: 18 kgs. of india rubber, 12 kgs. of resin, 6 kgs. of naphtha, 100 kgs. of colouring material, reduced to impalpable powder, substantially as above described and for the purpose set forth.

3. The process of making a new industrial product, comprising melting 18 kgs. of india rubber, and adding thereto 12 kgs. of resin, 6 kgs. of naphtha, and 100 kgs. of powdered colouring material, substantially as set forth.

4. The process of making a new industrial product, comprising melting 18 kgs. of india rubber, and adding thereto 12 kgs. of resin, a sufficient quantity of a rubber-dissolving organic solvent to dissolve the resin and india rubber, and 100 kgs. of powdered colouring material, substantially as set forth.

DOMINGO SANGUINETTI.

Witnesses:
A. L. BELLO,
ROSINDER ROSINDER.